June 2, 1959 C. E. McMINN ET AL 2,889,441
PREHEATER FOR MOLDING MATERIAL
Filed Jan. 14, 1958 2 Sheets-Sheet 1
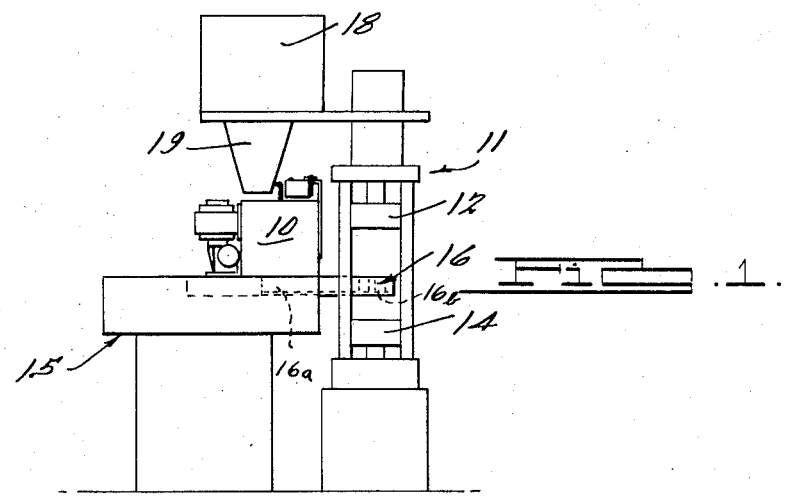
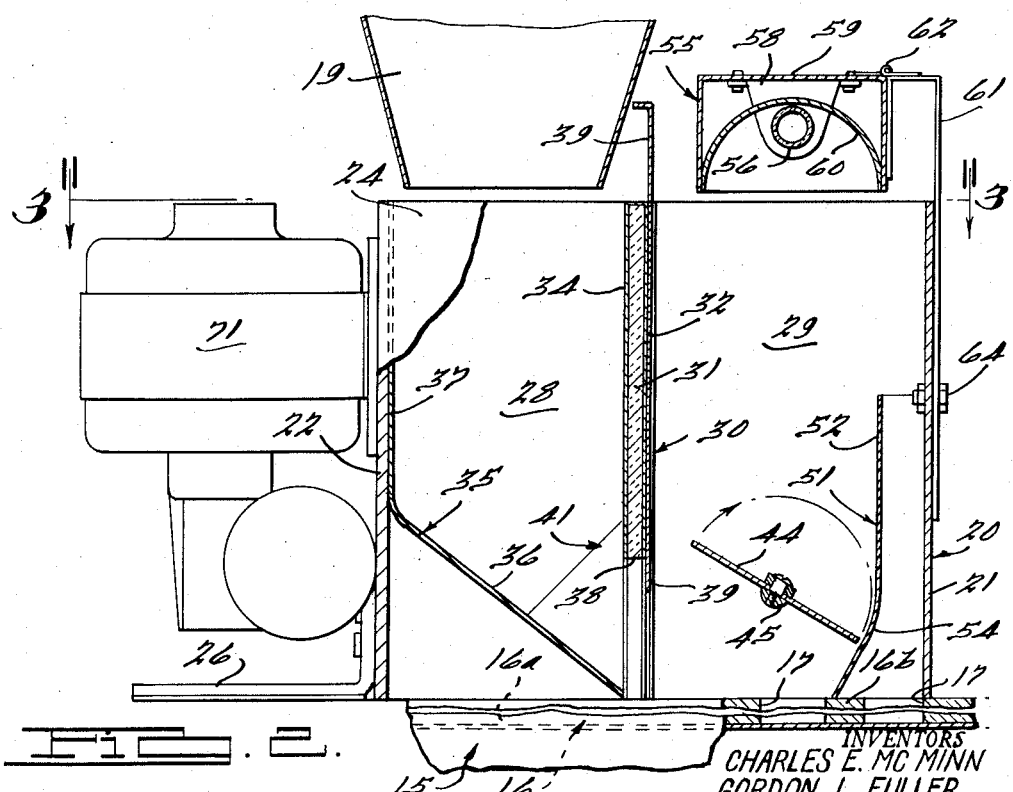
FIG. 2.
INVENTORS
CHARLES E. MC MINN
GORDON L. FULLER
BY
ATTORNEY

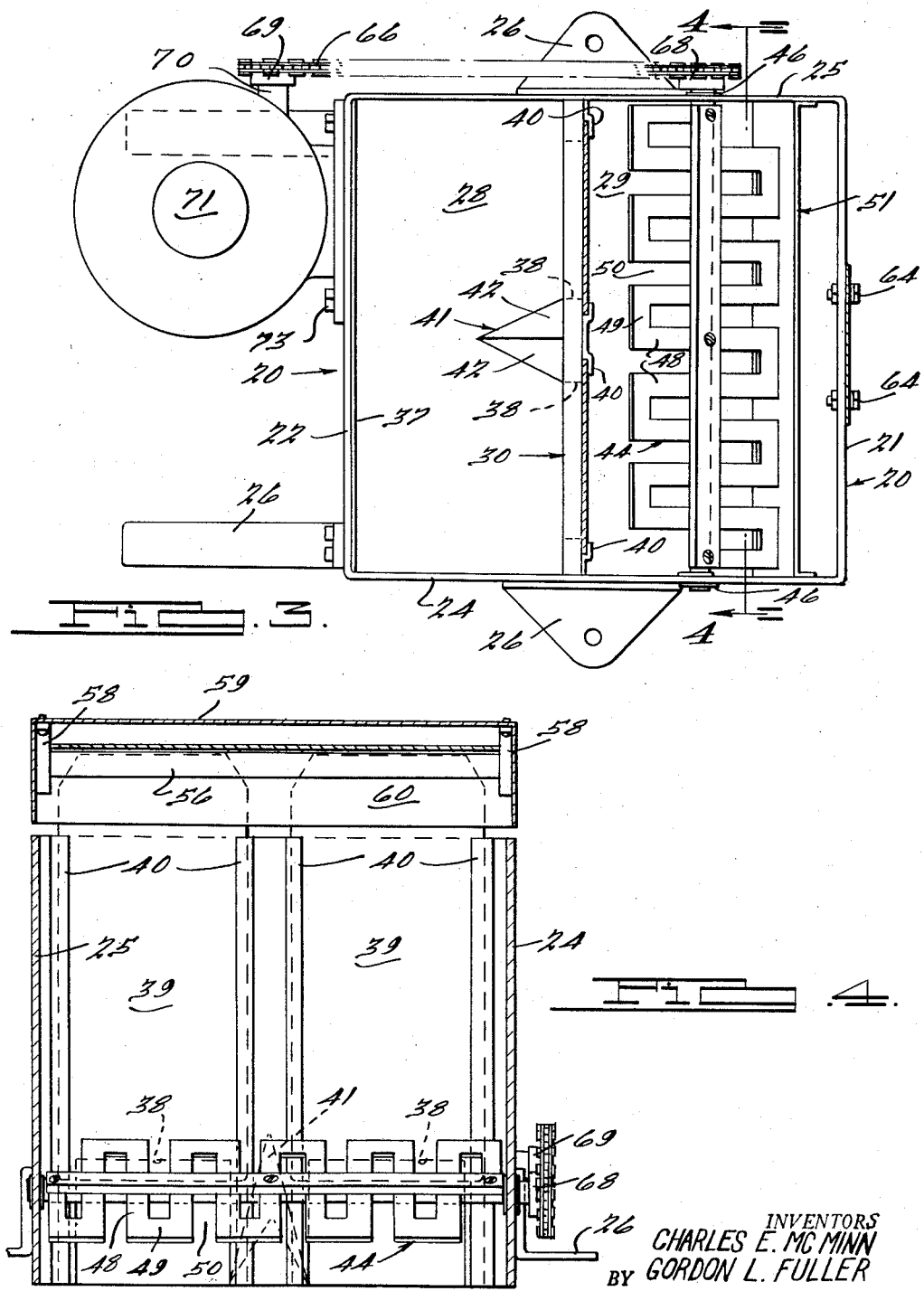

United States Patent Office 2,889,441
Patented June 2, 1959

2,889,441

PREHEATER FOR MOLDING MATERIAL

Charles E. McMinn and Gordon L. Fuller, Peru, Ind., assignors, by mesne assignments, to F. J. Stokes Corporation, Philadelphia, Pa., a corporation of Pennsylvania Application January 14, 1958, Serial No. 708,911

8 Claims. (Cl. 219—19)

This invention relates to apparatus for heating comminuted moldable material prior to its introduction into a heated mold cavity and more particularly to a preheater for comminuted moldable material that includes a source of radiant heat for heating the material and a means for agitating and dispersing the material to assure uniform exposure of the material to the heat source.

Preheating of resinous moldable materials and the like prior to the introduction thereof into a mold cavity has several well-known advantages. For example, preheating reduces the moisture content of the material, thereby increasing the electrical resistivity of the finished product. Also, when polymerizing materials are preheated, polymerization is started prior to introduction of the material into the mold cavity, thus reducing the time required for polymerization within the mold cavity.

An important factor upon which the time and pressure required for proper polymerization depend is the amount of heat required to be transferred from the mold cavity to the moldable material after its introduction into the mold. When the initial temperature gradient between the material and the mold cavity is reduced by preheating the material, the time of the molding cycle of the press can be shortened. A reduction in the amount of heat required to be added to the material within the mold cavity resulting from a reduced initial temperature gradient between the material and the mold cavity also permits a reduction in the pressure required to effect polymerization.

In addition, preheating of moldable material drives off some of the volatile resins within the material which, if present, would prolong the curing time by increasing the gas pressure within the mold cavity. A reduction of the gas pressure also improves the finish of the molded article by eliminating surface flow marks.

However, the foregoing advantages of preheating moldable material can be obtained to their fullest extent, and some disadvantages of preheating eliminated, only when the material is preheated uniformly to the proper temperature. For example, a temperature gradient within the charge of material when introduced into the mold cavity reduces or may eliminate the advantages of preheating and often results in a product inferior to that obtainable without preheating. Some of the disadvantages of improper preheating are caking of the moldable material, impairment of its flowing properties, and the like.

Many prior preheaters do not heat the material uniformly. Non-uniform heating often occurs when the flow of material past the heat source is continuous in one direction without re-exposure. Furthermore, because of a tendency to produce layers of different temperatures, preheaters using a moving belt or vibrating plate as a transfer mechanism for the material have been found to be unsatisfactory.

Accordingly, it is an object of the present invention to provide an improved preheater for comminuted moldable material.

Another object is to provide an improved preheater for comminuted material that heats the material uniformly.

Another object is to provide an improved preheater for comminuted material that does not cause caking of the material.

Another object is to provide a preheater for moldable material which is of simple construction and which utilizes an inexpensive heat source.

Another object is to provide a preheater having an improved means for agitating and dispersing the material so as to expose it uniformly to a heat source.

A more detailed object is to provide a preheater for moldable material having a rotating blade which carries the material from a lower portion of a heating chamber upwardly toward a heat source and which subsequently allows the material to fall back through and around the blade by gravity from various levels.

A preheater in accordance with this invention preferably comprises a chamber heated from above by an infrared heat lamp and a means within the chamber for dispersing comminuted moldable material throughout a substantial volume of the chamber below the lamp as the material is moved away from an entry port to a location where the material can be automatically transferred to an adjacent molding press.

Other objects and advantages of this invention will become apparent from the following description wherein reference is made to the drawings in which:

Fig. 1 is a side elevation of a preheater in accordance with this invention shown in association with a conventional molding press;

Fig. 2 is a side elevation of the preheater of Fig. 1 partially in section;

Fig. 3 is a sectional view taken along the line III—III of Fig. 2; and

Fig. 4 is a sectional view taken along the line IV—IV of Fig. 3.

Referring to Fig. 1, a preheater 10 in accordance with this invention is shown in operative association with a conventional molding press or machine 11. The molding machine 11, the construction of which forms no part of the present invention, comprises an upper mold 12, a lower mold 14, and a transfer mechanism 15 including a horizontal reciprocable slide 16 having an imperforate portion 16a and a perforate portion 16b. The portion 16a is remote from the machine 11 and the portion 16b is adjacent the machine 11 and is provided with perforations or loading tube 17 for introducing preheated comminuted material in the conventional manner into mold cavities (not shown) formed in the molds 12 and 14. A storage hopper 18 supported from the top of the machine 11 holds a supply of moldable material above the preheater 10 for gravity feed through a hopper spout 19 directed downwardly toward the preheater 10.

Referring now to Figs. 2, 3 and 4, the preheater 10 of the present invention comprises a box-like enclosure 20 preferably of sheet metal and of generally rectagular horizontal cross-section. The enclosure 20 has a front wall 21, a rear wall 22, and opposite side walls 24 and 25. A plurality of spaced L-shaped flanges 26 may be provided on the exterior of the enclosure 20 at the bottom thereof to secure the preheater 10 to the transfer mechanism 15.

The enclosure 20 is divided into a metering chamber 28 and a heating chamber 29 by a vertically-disposed insulating dividing panel 30 comprising a sheet of thermal insulating material 31 disposed between sheet metal plates 32 and 34. The insulating material 31 is preferably asbestos and serves to reduce the heat transfer between the chambers 28 and 29.

The metering chamber 28 is provided with a flow director 35 extending between the side walls 24 and 25 and having a lower portion 36 disposed at an angle of approximately 40° from the horizontal and intersecting the dividing panel 30 along its lower edge. The flow director 35 has a portion 37 extending upwardly along the rear wall 22. Moldable material flows by gravity from the hopper spout 19 into the open top of the metering chamber 28 and is directed toward the dividing panel 30 by the sloping portion 36 of the flow director 35.

A pair of horizontally spaced rectangular openings 38 are formed in the lowermost portion of the dividing panel 30 to permit flow of the material from the metering chamber 28 into the heating chamber 29. Flow of the material from the metering chamber 28 into the heating chamber 29 may be regulated or controlled by a pair of vertically slidable gates 39 which block the flow of the moldable material through the openings 38, respectively, when moved to their lowermost positions and which permit a controlled or metered flow of the material therethrough when elevated adjustable amounts. The gates 39 are restrained for vertical movement by spaced flanges 40 secured to the dividing panel 30. The material, when in the chamber 28, may be guided toward the openings 38 by a suitable deflector 41 having a pair of intersecting inclined sides 42 of triangular configuration. The deflector 41 is disposed between the spaced openings 38 and between the flow director portion 36 and the dividing panel 30.

In accordance with this invention, the material upon entry into the heating chamber rests on the upper surface of the portion 16a of the slide 16 adjacent to the openings 38 when the slide 16 is in the retracted position of Fig. 2. The material is agitated and dispersed within the heating chamber 29 by a paddle-like agitating means 43 which in so doing transfers the material from its entry position into a discharge or egress position as will be described. The agitating means 43 comprises a paddle 44 fixedly mounted on a rotatable shaft 45 extending between the side walls 24 and 25 of the enclosure 20 and suitably journalled for rotation in a pair of bearings 46 carried by the side walls 24 and 25, respectively.

Preferably, the paddle 44 is of serpentine construction having longitudinally spaced radial leg portions 48 extending on opposite sides of the shaft 45 and jointed at opposite ends alternately by longitudinal portions 49. Openings 50 through the paddle 44 are defined by the portions 48 and 49 and the shaft 45 and provide for dispersion of the material and consequent exposure of the material to the heat source to be described by allowing the material to fall freely on all sides of the portions 48, 49 upon rotation of the shaft 45. This thorough agitation and exposure to heat precludes the formation of heated layers of material which would tend to cake the material.

To further insure uniform heating of the material, the heating chamber 29 is provided with a baffle plate 51 that extends between the side walls 24 and 25 of the enclosure 20 inwardly of the wall 21. The baffle plate 51 has an upper vertically disposed planular portion 52 substantially parallel to and closely spaced from a plane tangent to the outermost arc of rotation of the paddle 44 and a lower arcuate portion 54 concentric with and having a slightly larger radius than the maximum radius of the paddle 44.

A box-like lamp enclosure 55 having a lower open side facing the heating chamber 29 is mounted above the chamber 29. A suitable heat lamp 56, such as a tubular infra-red lamp, is mounted in a pair of conventional receptacles 58 attached to the interior of a top wall 59 of the lamp enclosure 55. The lamp 56 radiates infra-red energy into the heating chamber 29, a reflector 60 being interposed between the lamp 56 and wall 59 if desired. The lamp enclosure 55 is attached to an L-shaped bracket 61, preferably by suitable hinges 62 that allow the enclosure 55 to be swung upwardly and away from the open top of the heating chamber 29 to provide for easy access into the heating chamber 29 and to facilitate lamp replacement. The L-shaped bracket 61 may be mounted on the exterior of the end wall 21 of the enclosure 20 by bolts 64 received in respective circular openings in the wall 21 and passing through suitable slots in the bracket 61 to provide for vertical adjustment of the lamp-to-agitator distance.

The agitating means 44 may be driven in the direction of the arrow by any suitable means shown as a chain 66 extending between a sprocket 68 rigid with the shaft 45 and a sprocket 69 secured on an output shaft 70 of a suitable gear reducer motor 71. The gear reducer motor 71 may be conveniently mounted on the rear wall 22 of the enclosure 20 by suitable bolts 73. As one example, for use with Bakelite, an agitator speed of 43 r.p.m. has been found to be satisfactory when a 500 watt infra-red lamp is at a distance of eight inches from the agitator shaft 45.

In operation, the material enters the metering chamber 28 through the hopper spout 19 and metered amounts are allowed to flow into the lower left hand portion (Fig. 2) of the heating chamber 29 through the openings 38. The material is then picked up by the rotating paddle 44 and raised toward the heat lamp 56. As the paddle 44 turns with its load of material, the material falls freely through a substantial portion of the chamber 29 within the heat zone of the lamp. The material falls to the right (Fig. 2) of its entry position. If the slide 16 is in its extended position, the material falls on the upper surface of the imperforate portion 16a of the slide 16 and is again picked up by the paddle 44. When the slide 16 is in its retracted position of Fig. 2, the material falls into the loading tubes 17. By correlating the heat intensity in the lower portion of the chamber 29 by lamp selection, lamp position or otherwise, the amount and nature of the material permitted to enter the chamber 29, the speed of rotation of the paddle 44, the frequency of loading the machine 11, and the amount of material used in each loading, any desired degree of preheating can be readily obtained.

What is claimed is:

1. In a preheater for comminuted moldable material having a heating chamber, an inlet for introduction of said material at one location in the lower portion of said chamber, a discharge opening to permit discharge of said material from a second location in the lower portion of said chamber and a heating source in the upper portion of said chamber for directing radiant heat energy into said lower portion of said chamber between said first and second locations, the improvement which includes means in the lower portion of said chamber positioned between said inlet and said discharge opening for moving said material upwardly from said first location and for effecting transfer of said material so moved to said second location by allowing it to fall by gravity in dispersed form to said second location.

2. The improvement according to claim 1 in which said means in the lower portion of said chamber includes an agitator mounted for rotation about a horizontal axis.

3. The improvement according to claim 2 in which said agitator includes a blade for so moving said material at said first location.

4. The improvement according to claim 1 in which said discharge opening is in the bottom of said chamber.

5. In a preheater for comminuted moldable material having a heating chamber, an inlet for introduction of said material at one location in the lower portion of said chamber, a discharge opening to permit discharge of said material from a second location in the lower portion of said chamber and a heating source in the upper portion of said chamber for directing radiant heat energy into said lower portion of said chamber between said first and second locations, the improvement which includes means in the lower portion of said chamber positioned between said inlet and said discharge opening for moving said material upwardly from said first location and for effecting transfer of said material so moved to said second location by allowing it to fall by gravity in dispersed form to said second location, in which said discharge opening is in the bottom of said chamber beneath said second location and which further includes a transfer mechanism for removing said material from said discharge opening including a horizontally slidable plate mounted beneath said discharge opening having a perforate portion and an imperforate portion, and means for reciprocating said plate between a first position at which said perforate portion is beneath said discharge opening to receive said material from said second location and a second position at which said imperforate portion is beneath said discharge opening and said perforate portion releases said material received therein.

6. The preheater of claim 3 characterized in that said blade of said agitator has a plurality of openings through which said material falls by gravity in dispersed form during rotation thereof.

7. The preheater of claim 6 characterized in that said blade comprises a plurality of longitudinally spaced, U-shaped radially extending members, the bight portion of said U-shape extending generally longitudinally of and forming the outermost portion of said blade.

8. The preheater of claim 2 characterized in that said chamber is provided with a baffle plate positioned on the opposite side of said agitator from said inlet and having a substantially vertical upper planular portion substantially parallel to and closely spaced radially outwardly from a plane tangent to the arc of rotation of an outermost portion of said agitator and a lower arcuate portion concentric to and closely spaced radially outwardly from said arc of rotation.

References Cited in the file of this patent

UNITED STATES PATENTS

| | | |
|---|---|---|
| 1,837,070 | Roth | Dec. 15, 1931 |
| 1,868,512 | Ahlmann | July 26, 1932 |
| 1,951,342 | Bradley et al. | Mar. 20, 1934 |
| 2,279,577 | Martin | Apr. 14, 1942 |
| 2,408,285 | Ashbaugh | Sept. 24, 1946 |
| 2,412,057 | Nichols | Dec. 3, 1946 |
| 2,474,952 | Miskella | July 5, 1949 |
| 2,489,753 | Cox | Nov. 29, 1949 |
| 2,529,830 | Bierer | Nov. 14, 1950 |
| 2,713,697 | Willcox | July 26, 1955 |
| 2,736,064 | Rubin | Feb. 28, 1956 |
| 2,749,424 | Dieterich | June 5, 1956 |